US006768411B2

(12) United States Patent
Luttrell (10) Patent No.: US 6,768,411 B2
(45) Date of Patent: Jul. 27, 2004

(54) ELECTRIC MOTOR STATOR ASSEMBLY HAVING NOVEL WINDING ARRANGEMENT AND METHOD OF MAKING SAME

(75) Inventor: Craig W. Luttrell, Loganville, GA (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 10/411,841

(22) Filed: Apr. 11, 2003

(65) Prior Publication Data

US 2003/0173859 A1 Sep. 18, 2003

Related U.S. Application Data

(60) Continuation of application No. 09/931,599, filed on Aug. 16, 2001, which is a division of application No. 09/410,163, filed on Sep. 30, 1999, now Pat. No. 6,349,463.

(51) Int. Cl.[7] .............................................. H01F 27/28
(52) U.S. Cl. ...................................... 336/222; 310/184
(58) Field of Search ................................. 310/184, 180; 336/222, 208; 29/596, 606; 242/423

(56) References Cited

U.S. PATENT DOCUMENTS 3,622,823 A * 11/1971 Broadway et al. .......... 310/254
4,296,344 A * 10/1981 Rabe ......................... 310/184
6,226,163 B1 * 5/2001 Bernhoff et al. ........... 361/93.1

* cited by examiner

Primary Examiner—Anh Mai
(74) Attorney, Agent, or Firm—Patrick S. Yoder; Alexander M. Gerasimow (57) ABSTRACT

A stator assembly for use in an electromechanical machine includes an improved concentric winding arrangement. Groups of concentric coils are alternately inserted from both ends of the stator core. In other words, a first phase group is inserted from one end. The stator core is then rotated 180° for insertion of the second phase group. Next, the stator core is rotated back to its original position for insertion of the third phase group. The alternating process continues until all phase groups have been inserted. Preferably, the winding pattern utilizes a combination of full slots and shared slots, with full slots of different groups of the same phase being adjacent to one another. The invention permits the use of automated winding equipment in large inductions motors where hand insertion was often required in the past.

16 Claims, 12 Drawing Sheets

| SLOTS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| PHASE A | 5 | 5 | 3 | 3 | 3 | 3 |   |   |   |   |   |   |   |   |   |   |   |   | 3 | 3 | 3 | 3 | 5 | 5 |
| PHASE B |   |   | 3 | 3 | 3 | 3 | 5 | 5 | 5 | 5 | 3 | 3 | 3 | 3 |   |   |   |   |   |   |   |   |   |   |
| PHASE C |   |   |   |   |   |   | 5 | 5 | 5 | 5 | 3 | 3 | 3 | 3 | 5 | 5 | 5 | 5 | 3 | 3 | 3 | 3 |   |   |
| SLOT FILL | 5 | 5 | 6 | 6 | 6 | 6 | 5 | 5 | 5 | 5 | 6 | 6 | 6 | 6 | 5 | 5 | 5 | 5 | 6 | 6 | 6 | 6 | 5 | 5 |

| SLOTS | 25 | 26 | 27 | 28 | 29 | 30 | 31 | 32 | 33 | 34 | 35 | 36 | 37 | 38 | 39 | 40 | 41 | 42 | 43 | 44 | 46 | 46 | 47 | 48 |
|---|---|---|---|---|---|---|---|---|---|---|---|---|---|---|---|---|---|---|---|---|---|---|---|---|
| PHASE A | 5 | 5 | 3 | 3 | 3 | 3 |   |   |   |   |   |   |   |   |   |   |   |   | 3 | 3 | 3 | 3 | 5 | 5 |
| PHASE B |   |   | 3 | 3 | 3 | 3 | 5 | 5 | 5 | 5 | 3 | 3 | 3 | 3 |   |   |   |   |   |   |   |   |   |   |
| PHASE C |   |   |   |   |   |   | 5 | 5 | 5 | 5 | 3 | 3 | 3 | 3 | 5 | 5 | 5 | 5 | 3 | 3 | 3 | 3 |   |   |
| SLOT FILL | 5 | 5 | 6 | 6 | 6 | 6 | 5 | 5 | 5 | 5 | 6 | 6 | 6 | 6 | 5 | 5 | 5 | 5 | 6 | 6 | 6 | 6 | 5 | 5 |

ELECTRIC MOTOR STATOR ASSEMBLY HAVING NOVEL WINDING ARRANGEMENT AND METHOD OF MAKING SAME

The following is a continuation of application Ser. No. 09/931,599, filed on Aug. 16, 2001, which is a divisional of application Ser. No. 09/410,163, filed on Sep. 30, 1999 and subsequently issued as U.S. Pat. No. 6,349,463 on Feb. 26, 2002.

BACKGROUND OF THE INVENTION

The present invention relates generally to the art of electric motors and other electromechanical machines. More particularly, the invention relates to an improved winding arrangement for the stator of an electromechanical machine.

Electric motors and other electromechanical machines are generally constructed having a cylindrical stator core. The inner circumference of the stator core defines a plurality of radial slots in which electrical windings are maintained. As is well known, current flow through the windings produces a rotating magnetic field which the rotor of the machine will tend to follow.

The stator windings of an AC induction motor are typically arranged into a plurality of coil groups, with each coil group providing a single pole of a single phase. Each side of an individual coil typically shares a particular winding slot with one side of another coil in a different coil group. Thus, a common three-phase, two-pole induction motor will have a total of six coil groups. Typically, each of the coil groups in such a motor will be configured having eight coils, yielding a total of forty-eight coils. These forty-eight coils have a total of ninety-six coil sides, located in forty-eight winding slots.

The art has developed several winding patterns in which the coil groups can be arranged. For example, one arrangement that has seen widespread use in industry is the "lap winding." In this arrangement, one side of a coil will be in the "bottom" of a particular winding slot, while the other side of the same coil will be positioned in the "top" of another slot several slot positions away. Moreover, the respective sides of every coil will be separated by the same number of slot positions. Thus, the individual coils overlap each other around the inner circumference of the stator core.

Another common winding arrangement is referred to as a "concentric winding." In this type of arrangement, coils within a group are organized concentrically, such that sides of each coil will be separated by a different number of slot positions.

"Lap windings" and "concentric windings" each offer certain advantages not offered by the other. For example, lap windings typically exhibit outstanding operational characteristics. The lap winding process, however, has been extremely difficult to automate. Concentric windings, on the other hand, are amenable to automation. Thus, concentric windings are often preferred when motor cost is a significant factor.

While cost considerations tend to make the use of concentric windings desirable, it has not been possible to provide concentric windings in all motor sizes. For example, it has been found necessary to manually wind motors of 200 HP or larger with a lap winding pattern. This is due to the nature of a concentric winding pattern, in which the motor's lead wires must be attached to only one side of the stator core. With the large lead wires required at higher power levels, a standard frame size, such as a NEMA 440 frame, simply does not provide sufficient clearance to route the lead wires to the frame's conduit box opening. A lap winding pattern permits smaller lead wires to be connected at each end of the stator core, which are more easily routed to the conduit box opening in the frame.

SUMMARY OF THE INVENTION

The present invention recognizes and addresses the foregoing disadvantages, and others, of prior art constructions and methods. Accordingly, it is an object of the present invention to provide a novel winding arrangement for the stator of an electromechanical machine.

It is a more particular object of the present invention to provide a novel winding arrangement of the concentric winding type.

It is a specific object of the present invention to provide a concentric winding arrangement that permits connection of motor leads to windings at both ends of the stator core.

It is a specific object of the present invention to provide a novel winding arrangement that facilitates automated winding of stators intended for use in large electric motors.

Some of these objects are achieved by a stator assembly for an electromechanical machine comprising a magnetically permeable stator core. The core has a cylindrical inner surface defining a plurality of radial, axially-extending winding slots. At least six coil groups of electrical windings are also provided, each of the coil groups having a plurality of winding coils arranged concentrically. A predetermined number of winding coils within each group are singularly located in spaced apart pairs of winding slots. In addition, the remaining number of winding coils within each coil group is shared in spaced-apart pairs of winding slots along with coil sides of winding coils in other groups.

For example, each coil group may comprise a total of six winding coils. In such embodiments, two of the six winding coils may be singularly located in winding slots and the remaining four may share winding slots with other coil sides. Often, the magnetically permeable core may define a total of forty-eight winding slots.

Preferably, the stator core may comprise a number of power leads equal to the number of coil groups. The power leads are preferably arranged such that an equal number will be connected to the electrical windings at each end of the stator core. For example, if the stator assembly has a total of six power leads, three of the power leads may be connected to electrical windings at each of the stator core's two ends.

Other objects of the present invention are achieved by a stator assembly for an electromechanical machine comprising a magnetically permeable stator core. The core has a cylindrical inner surface defining a plurality of radial, axially-extending winding slots. At least six coil groups of electrical windings are also provided, each of which has a plurality of winding coils arranged concentrically. The stator assembly includes a number of power leads equal to a number of coil groups. The power leads are connected to electrical windings at each end of the stator core.

The stator assembly may be configured having a total of six coil groups arranged to provide a three-phase, two-pole stator assembly. In such embodiments, three power leads are preferably connected to electrical windings at each end of the stator core.

It will often be advantageous to include a total of six winding coils within each of the coil groups Two of the six winding coils are singularly located in winding slots and four of the six winding coils share winding slots with coils of other groups.

Still further objects of the present invention are achieved by a method of producing a stator assembly for use in an electromechanical machine. One step of the method involves providing a magnetically permeable stator core having a cylindrical inner surface defining a plurality of radial, axially-extending winding slots. At least six coil groups are also provided, each having a plurality of differently-sized winding coils. The coil groups are inserted into the stator core one at a time from alternating sides thereof.

According to exemplary methodology, each of the coil groups are inserted such that a predetermined number of winding coils are singularly located in spaced apart pairs of winding slots. A remaining number of winding coils may be placed in spaced apart pairs of winding slots along with coil sides of winding coils in other groups. Preferably, the coil groups may be inserted in the stator core such that winding coils that are singularly located in one coil group are positioned adjacent to winding coils that are singularly located in another coil group within a mutual phase.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one skilled in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
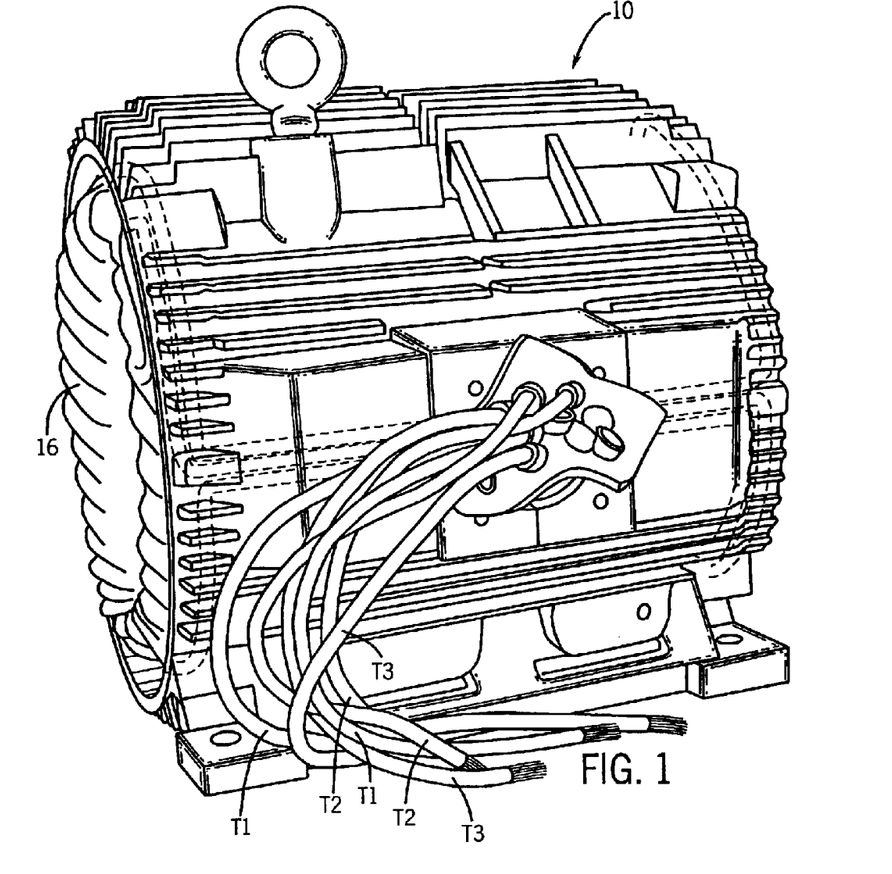
FIG. 1 is a perspective view of a large motor frame having a stator assembly of the present invention installed therein.

Referring now to FIG. 1, a relatively large motor frame 10 is shown as it may appear at an intermediate stage in the manufacturing process. A stator assembly has been installed in the frame at this stage, but other components have not. For example, frame 10 does not include a rotor, or the end bells that are later installed on the frame's open ends. Typically, frame 10 will conform to some applicable standard, such as NEMA 440.

Figure 2:
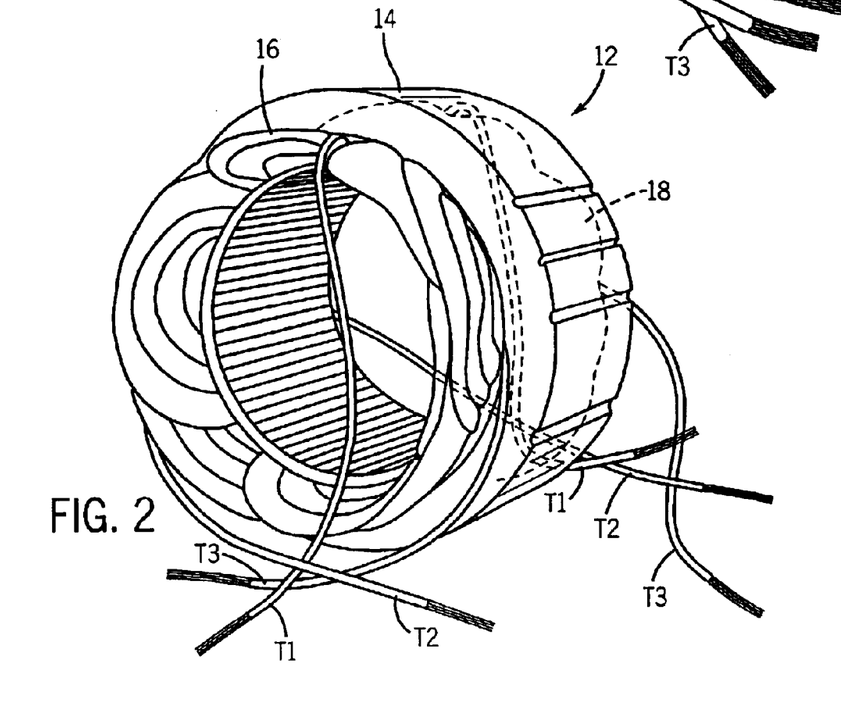
FIG. 2 is a perspective view of a stator assembly of the present invention.

FIG. 2 illustrates a stator assembly 12 such as may be installed in frame 10. Stator assembly 12 includes a magnetically permeable stator core 14 having electrical windings located in a plurality of radial, axially-extending winding slots. The winding coils turn beyond the end faces of core 14, thus forming respective "coilheads" 16 and 18. In this example, the winding pattern achieves a three-phase, two-pole stator assembly. A trio of relatively small diameter power leads T1, T2 and T3 extends from both ends of the stator core.

Figure 3:
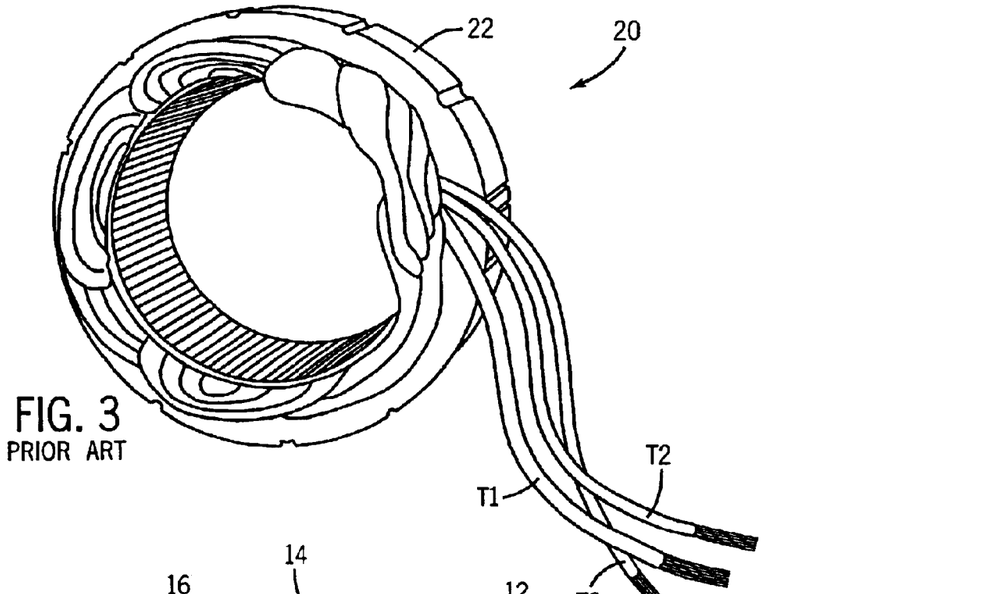
FIG. 3 is a perspective view, similar to FIG. 2, of a prior art stator assembly having a concentric winding arrangement.

A stator assembly 20 of the prior art is illustrated in FIG. 3. Stator assembly 20 includes a stator core 22, which may be identical to stator core 14. Unlike stator assembly 12, however, the windings of stator assembly 20 are arranged in a known concentric winding pattern. This conventional winding arrangement includes six coil groups of eight coils each, connected to achieve a three-phase, two-pole stator assembly. Three large power leads T1, T2 and T3 extend from one end of core 22.

As noted above, the large power leads of the conventional arrangement have prevented the use of concentric winding patterns in some large electric motors. Due to the current demands of these motors, the leads are simply too big to fit through the relatively small gap provided between the inner surface of the frame and the stator core's outer diameter.

The present invention overcomes this problem by allowing the connection of power leads at both ends of the stator core. This is illustrated in FIG. 1, where one set of power leads T1, T2 and T3 are routed from a first end of stator assembly 12 to the conduit box opening of frame 10. Likewise, another set of power leads T1, T2 and T3 are routed from the opposite end of stator assembly 12 to the conduit box opening. Corresponding leads from each set are then connected together outside of the motor housing. Although the multiple leads are individually smaller, they have at least the same current carrying capacity when connected together as a larger single lead.

Figure 4:
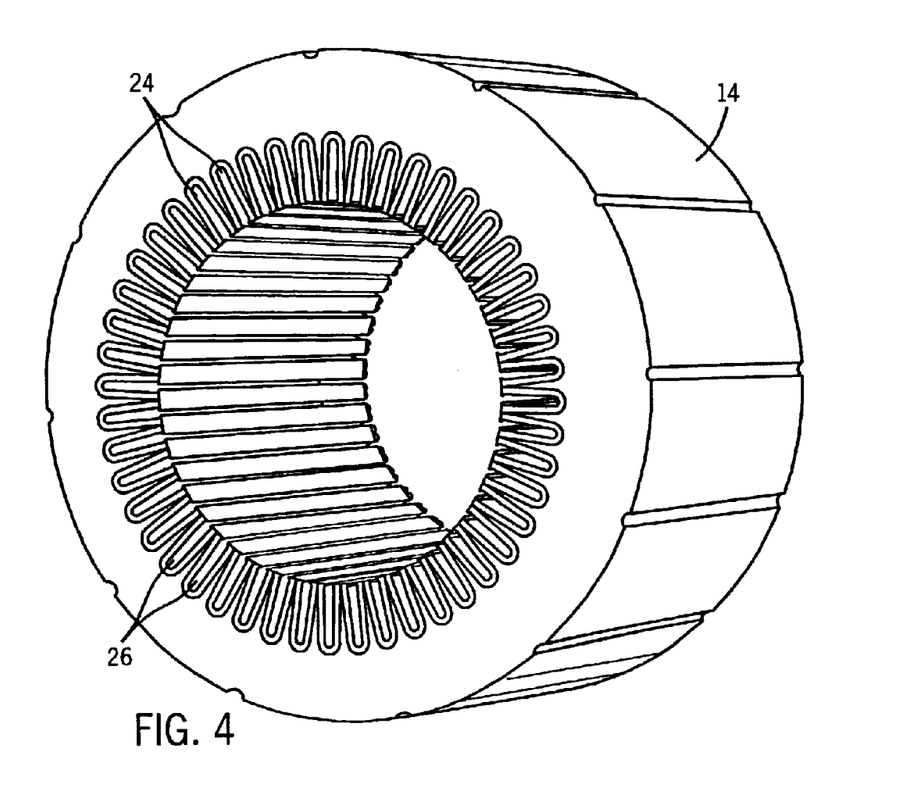
FIG. 4 is a perspective view of a magnetically permeable stator core before electrical windings have been inserted into slots thereof.

Referring now to FIG. 4, stator core 14 is conventionally made of a plurality of core laminations arranged in a stack. Also in a conventional manner, winding slots 24 each contain an individual slot liner 26. The slot liners serve to insulate the metallic core from the electrical windings contained in that slot.

In the three-phase, two-pole stator assembly of the exemplary embodiment, six coil groups are provided, each of which has six concentric coils. One coil group thus forms a single pole of a single phase, such that two coil groups are associated with each of the three electrical phases that will be used to drive the motor. Stator core 14 has a total of forty-eight winding slots in this case.

Figure 5:
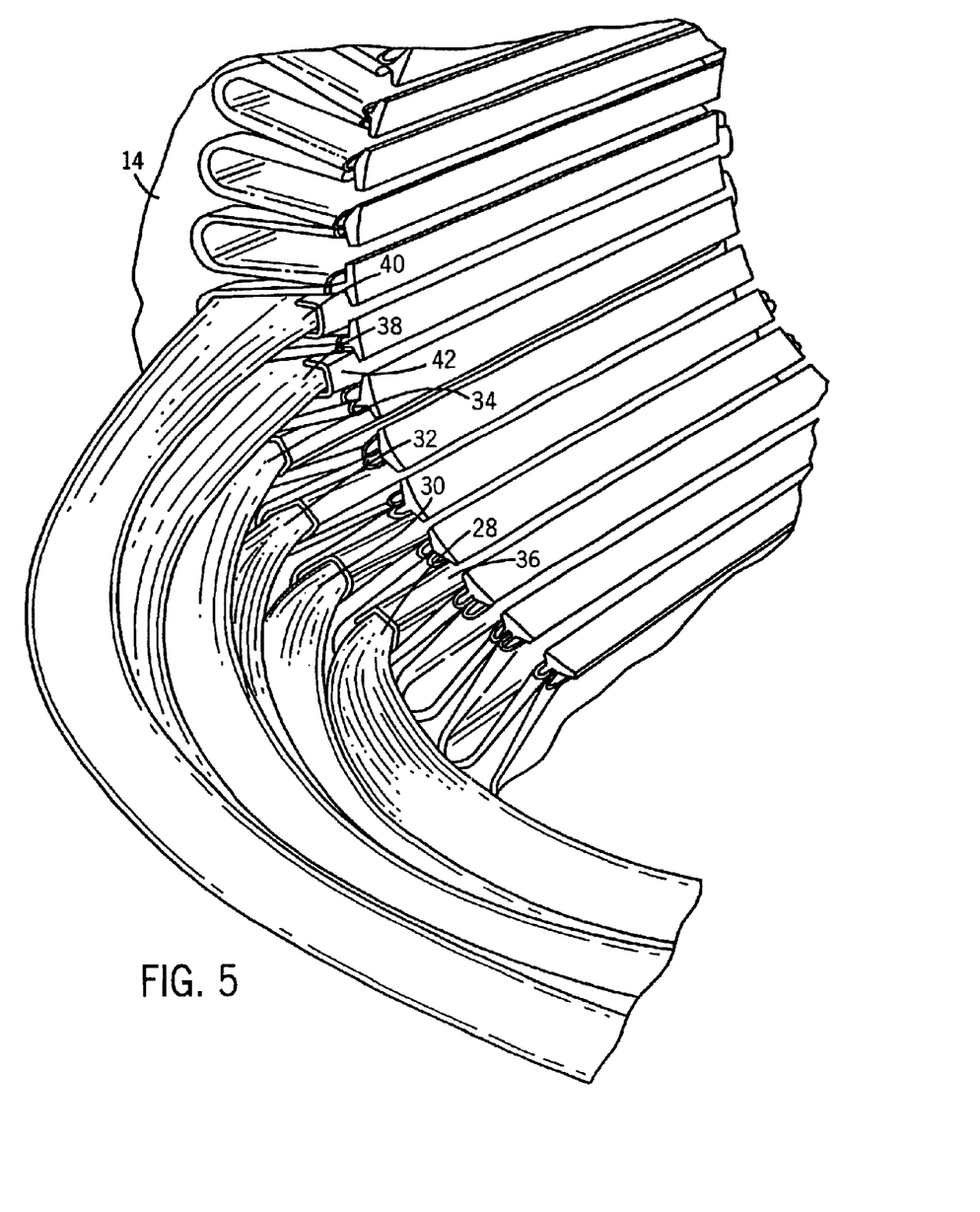
FIG. 5 is an enlarged fragmentary view of a portion of a stator assembly showing a concentric winding pattern according to the present invention.

FIG. 5 shows an enlarged portion of stator core 14 after one of the coil groups has been inserted therein. The four innermost coil sides 28, 30, 32 and 34 occupy the bottom portion of their respective winding slot. These winding slots will be shared with coils of another group, with the coils of different groups being insulated from each other by an insulative divider 36. The two outermost coil sides 38 and 40 are singularly located in their respective winding slot (i.e., these coils do not share the winding slot with others). The coils of these winding slots are preferably "capped" by an insulative top stick 42.

Figure 6:
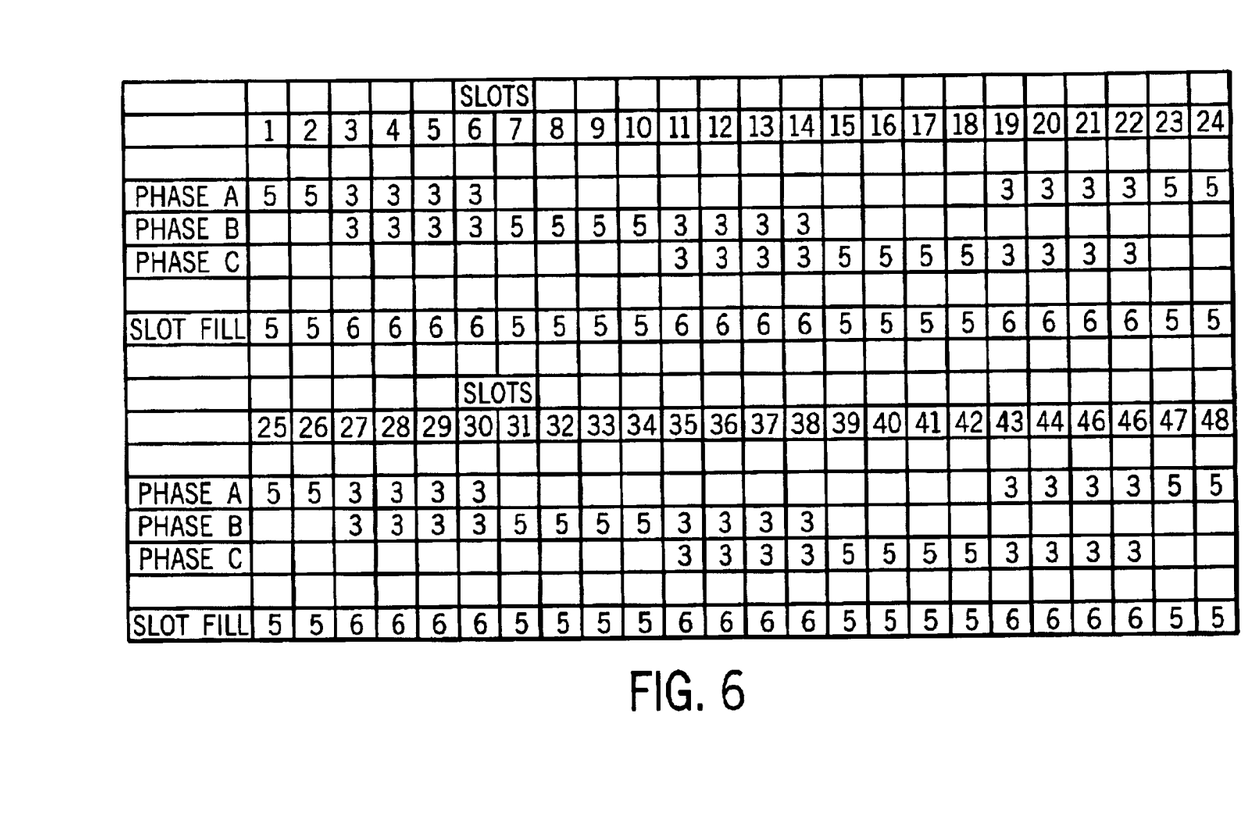
FIG. 6 is a chart illustrating a concentric winding pattern of the present invention.
Figure 7:
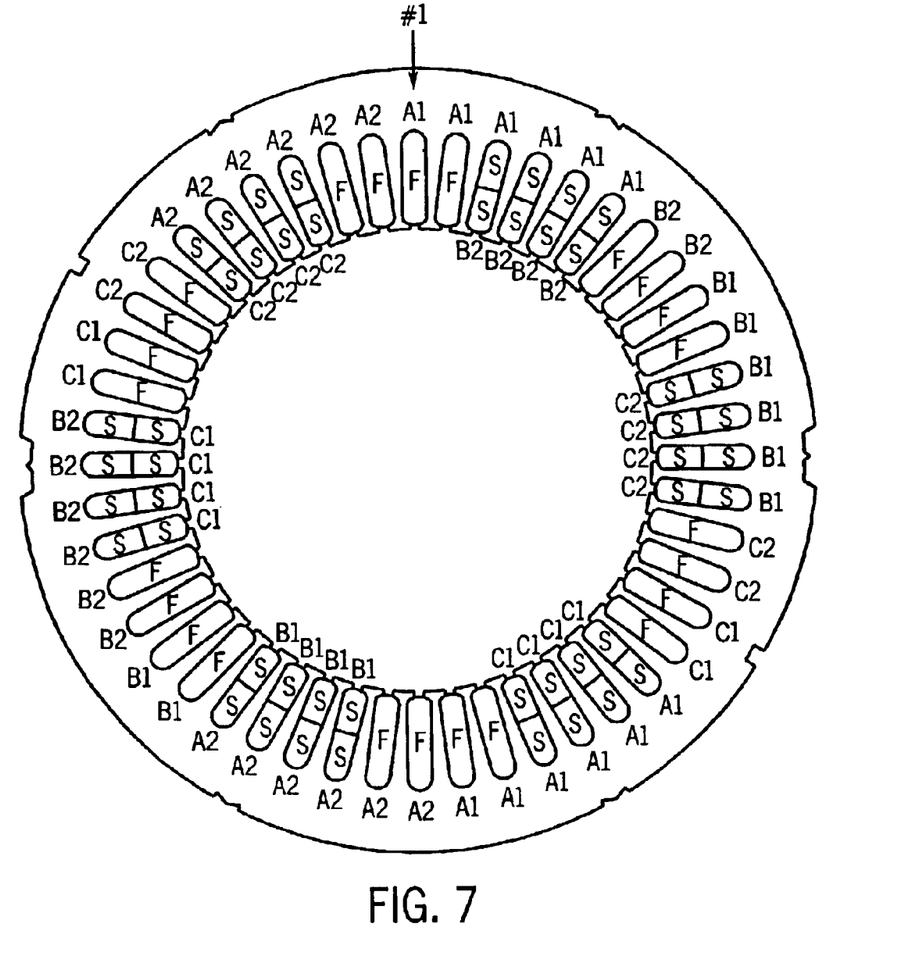
FIG. 7 is a diagrammatic representation of a stator core showing the manner in which the winding slots are filled according to the pattern of FIG. 6.

The winding pattern can be more fully understood with reference to the chart of FIG. 6, which shows the contents of each winding slot. The number "5" indicates that the slot is filled by one side of a respective coil. On the other hand, the number "3" indicates that the slot is half full, and can be shared with a coil side of another coil. Thus, shared slots have a "slot fill" value of "6" while singular slots have a "slot fill" value of "5." This is also illustrated in FIG. 7, where "full" slots are indicated by "F," whereas shared slots are indicated by an "S."

For purposes of discussion, consider the coils of group A1. One side of the two outermost coils are located in winding slots 1 and 2, respectively. The other sides of these same coils are respectively located in slots 24 and 23. Similarly, one side of the four inner coils are located in slots 3, 4, 5 and 6. The other sides of these coils are respectively located in slots 22, 21, 20 and 19.

In a similar manner, the coils of group A2 are located in slots 25–30 and 43–48. Furthermore, corresponding groups of other phases are offset by 60° (eight slot positions). In other words, group B1 is separated by eight slot positions from group A1 and group C1.

According to this arrangement, full slots of one group within a phase will be adjacent to full slots in the other group within the same phase. For example, slots 23 and 24 will carry a full coil side from the outermost coils of group A1. Adjacent slots 25 and 26 will carry full coil sides from the outermost coils of group A2. This adjacent placement of full slots of different coil groups within a mutual phase is believed to eliminate some of the electrical imbalances present in concentric winding arrangements, thus yielding enhanced motor performance.

Like concentric winding arrangements of the prior art, the novel winding arrangement of the present invention is amenable to insertion in the stator core using automated equipment designed for this purpose. In contrast to the prior art, however, the winding arrangement of the present invention can be employed in significantly larger motors. In these larger motors, manually-inserted lap winding arrangements have often been required in the past. Because automated equipment can now be used, the time required to wind one of these larger stator cores can be significantly reduced.

Figure 8:
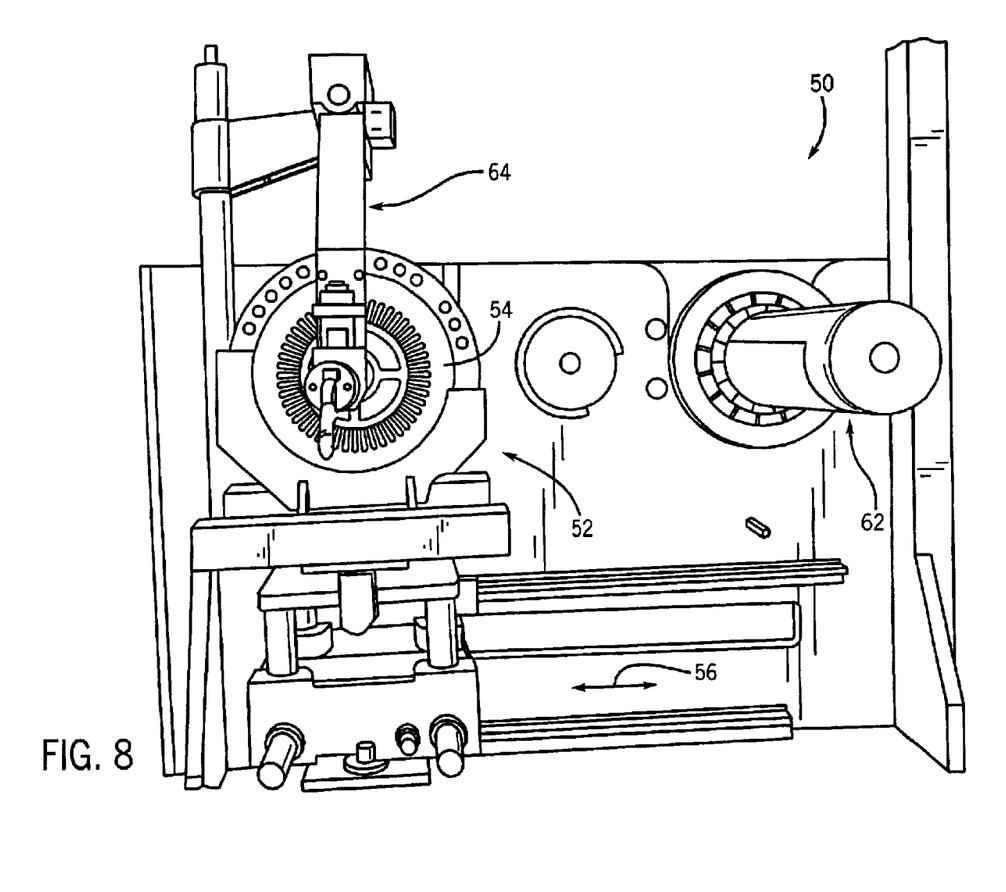
FIG. 8 is an end view of an automated winding machine that may be used in the production of a stator assembly according to the present invention.
Figure 9:
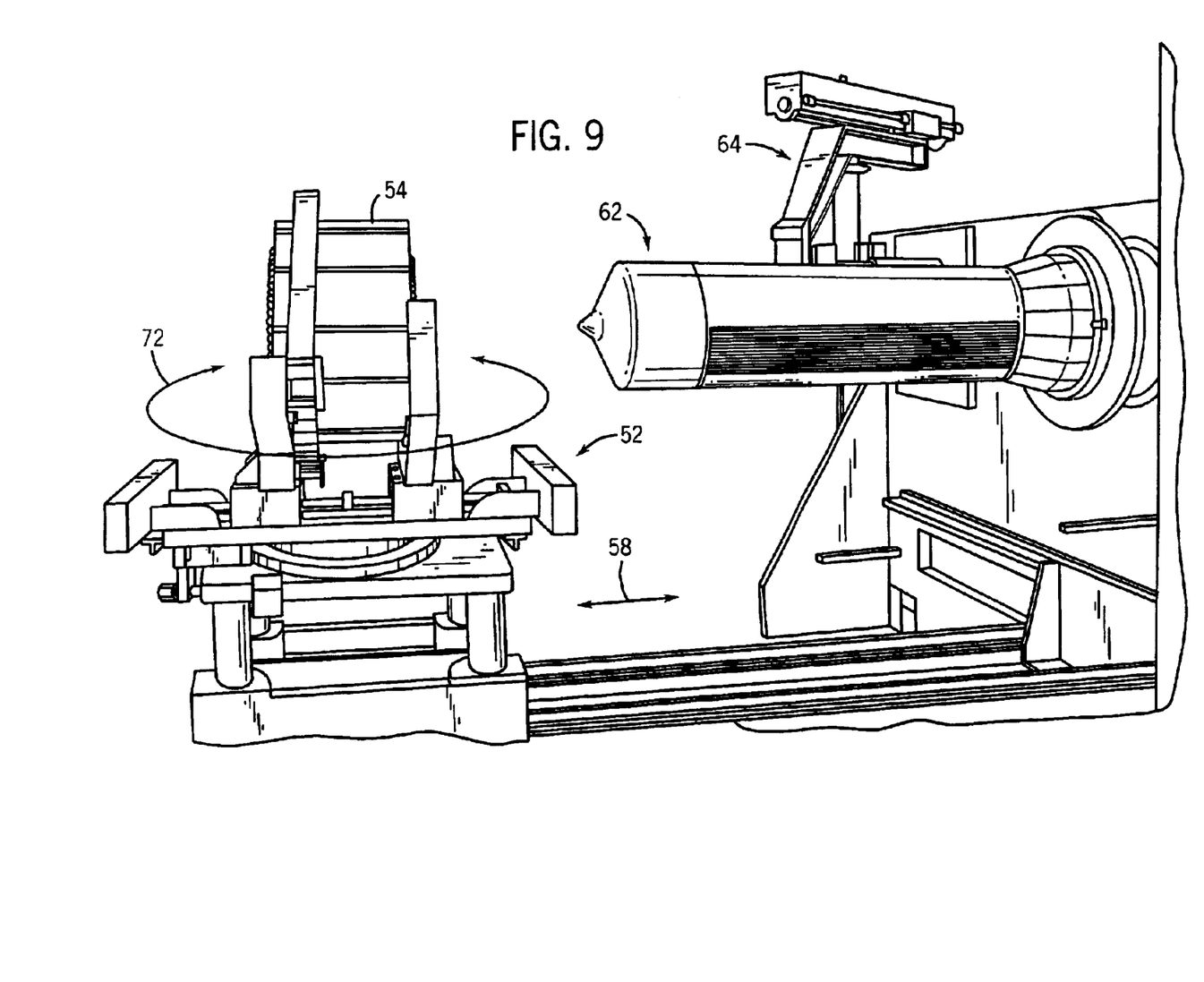
FIG. 9 is a side view of the automated winding machine, illustrating the manner in which the stator core is rotated for insertion of the next winding group.

FIGS. 8 and 9 illustrate a machine 50 that can be utilized to produce the desired winding arrangement. Machine 50 includes a carriage 52 having thereon a stator core 54. As indicated by arrow 56, carriage 52 is movable to the left and right of the machine. Carriage 52 is also movable forward and back, as indicated by arrow 58.

Machine 50 includes two primary mechanisms that function to produce the wound core, insertion tool 60 (FIG. 10) and an elongate drift tool 62. Typically, the coils of a coil group are first wound on a rotating coil form (not shown) located separate from machine 50. The coil group is then moved from the coil forms to insertion tool 60, such as by the use of a suitable transfer tool 64.

Figure 10:
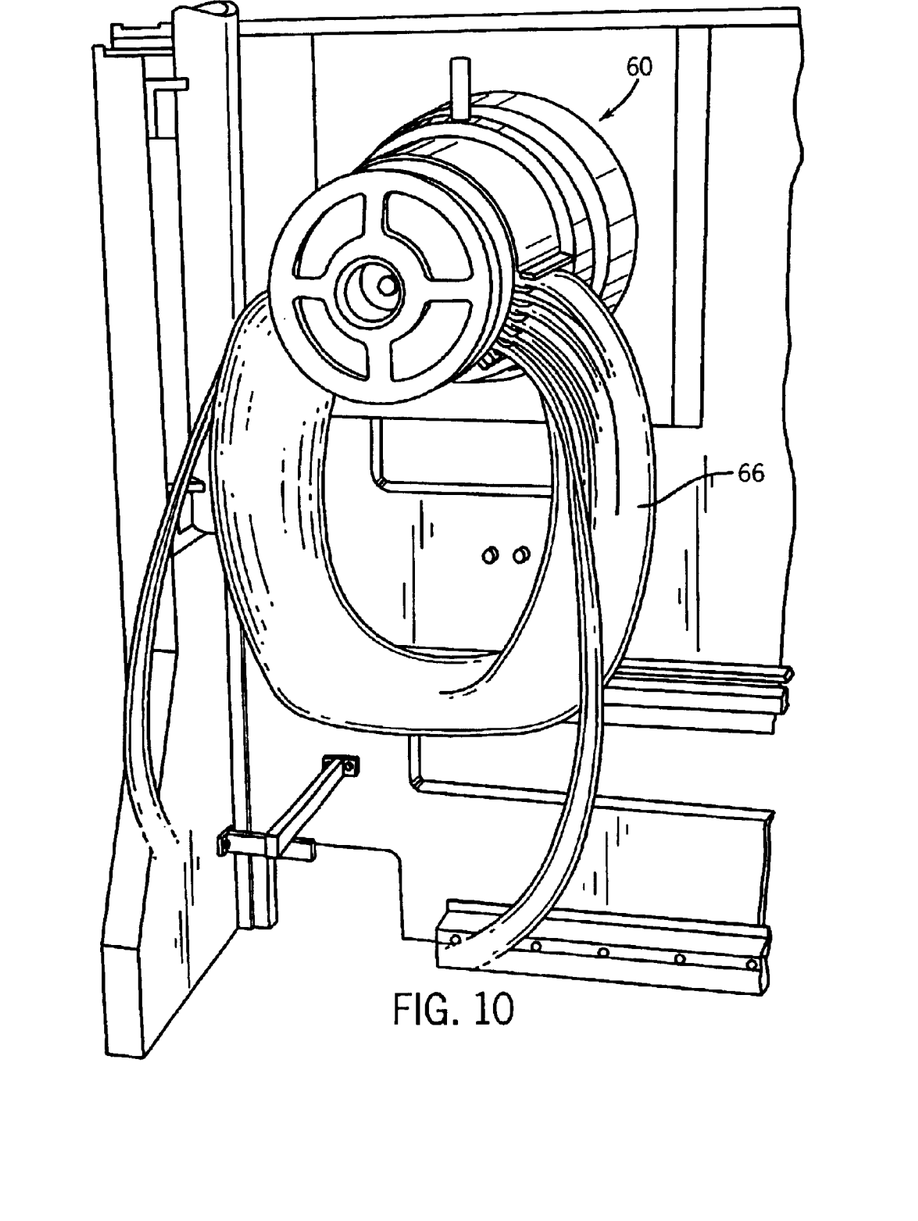
FIG. 10 is a perspective view of an insertion tool of the automated winding machine, the insertion tool having a coil group located thereon for insertion into the winding slots of a stator core.
Figure 11:
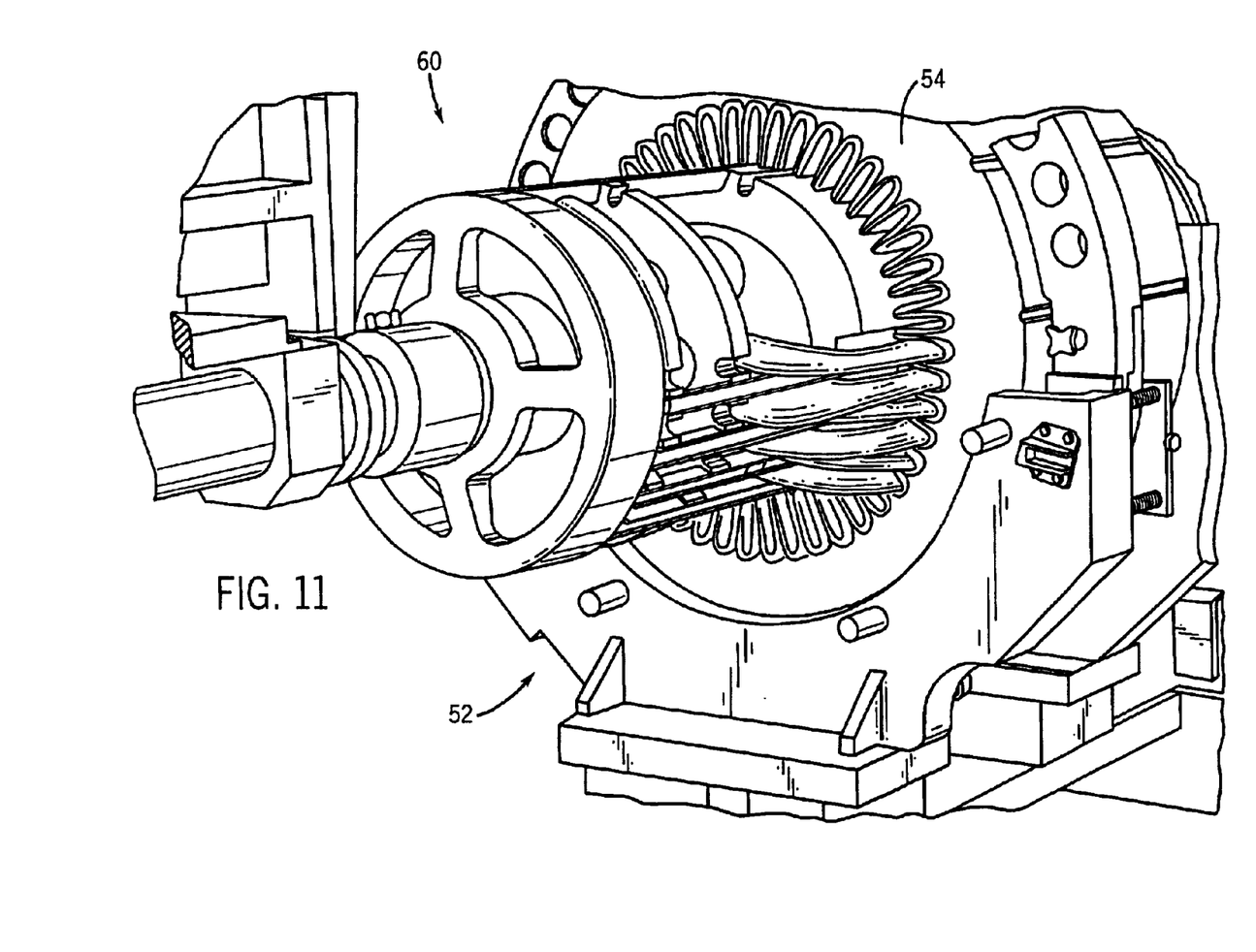
FIG. 11 is a perspective view of the insertion tool of FIG. 10 showing the coil group being inserted into the winding slots of a stator core.

Referring now to FIGS. 10 and 11, stator core 54 is brought into position directly in front of insertion tool 60 when a coil group 66 has been placed thereon. Then, as shown in FIG. 11, the coils are drawn through the desired winding slots of stator core 54. Top sticks and insulative divider wedges are pushed into the winding slots at the same time. After the coils have been inserted into the slots in this manner, carriage 52 is moved into position in front of drift tool 62.

Figure 12:
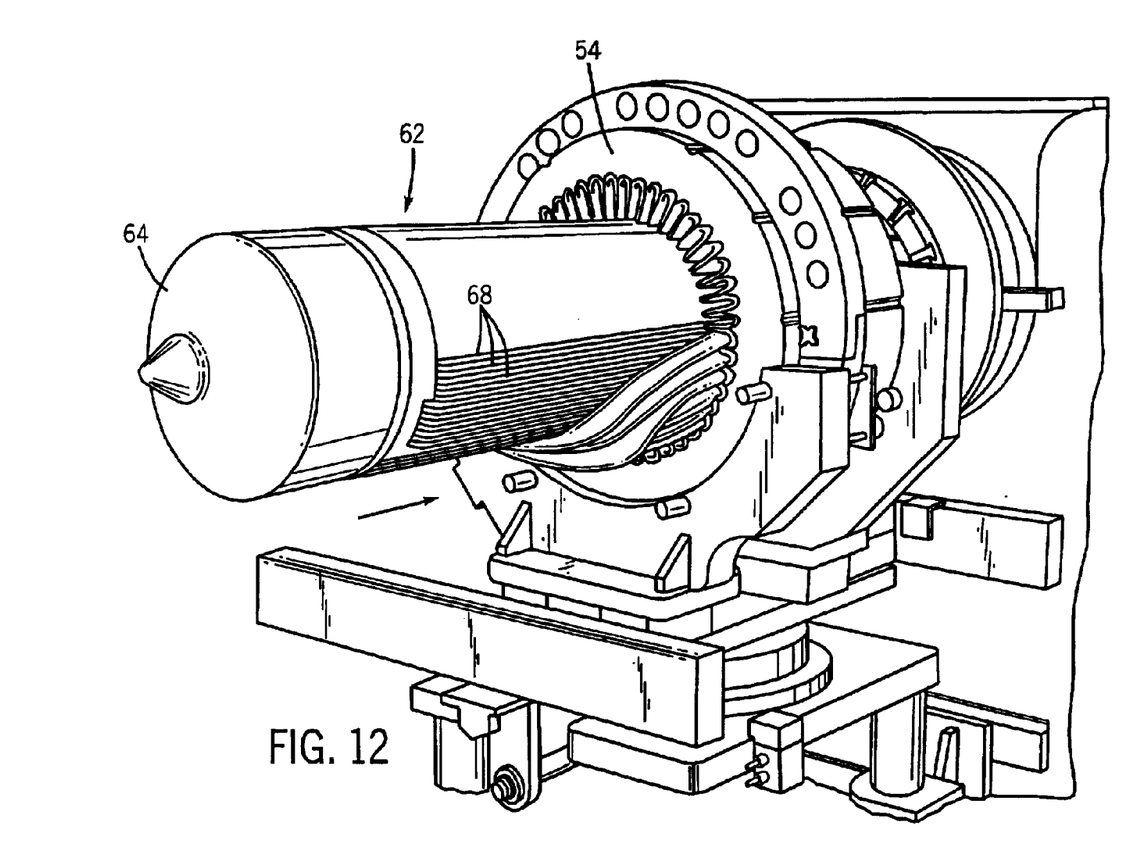
FIG. 12 is a perspective view showing use of the drift tool of the automated winding machine.

As shown in FIG. 12, carriage 52 is next moved forward such that drift tool 62 will enter the opening of core 54. Because the core opening is slightly obstructed by the windings, drift tool 62 has a "bullet-shaped" end 64. End 64 is preferably made from a relatively smooth metal that tends to simply push the windings out of the way. A plurality of parallel bars 68, located on the side of drift tool 62, extend slightly into the winding slots, causing a respective coil side located therein to be compressed. This produces room for subsequent coil sides in winding slots that are to be shared.

Figure 13:
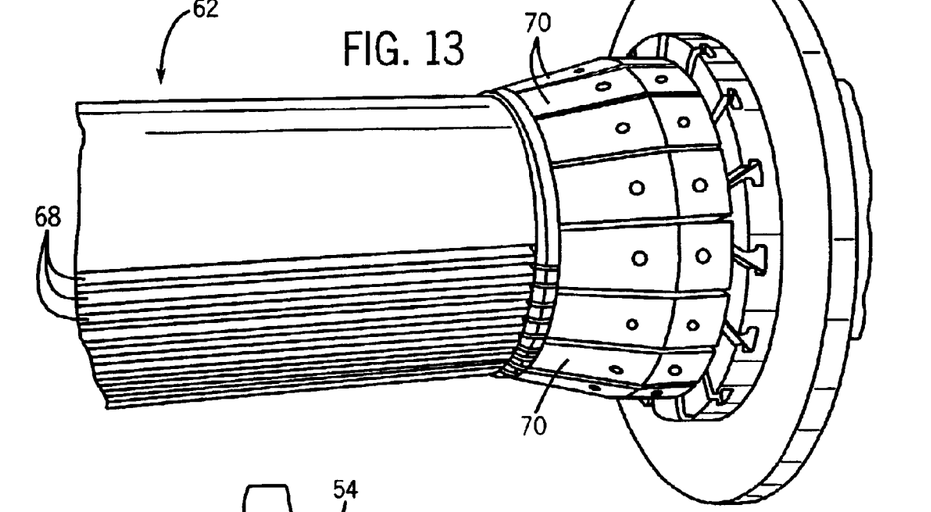
FIGS. 13 and 14 illustrate the radially expanding members at the base of the drift tool.
Figure 14:
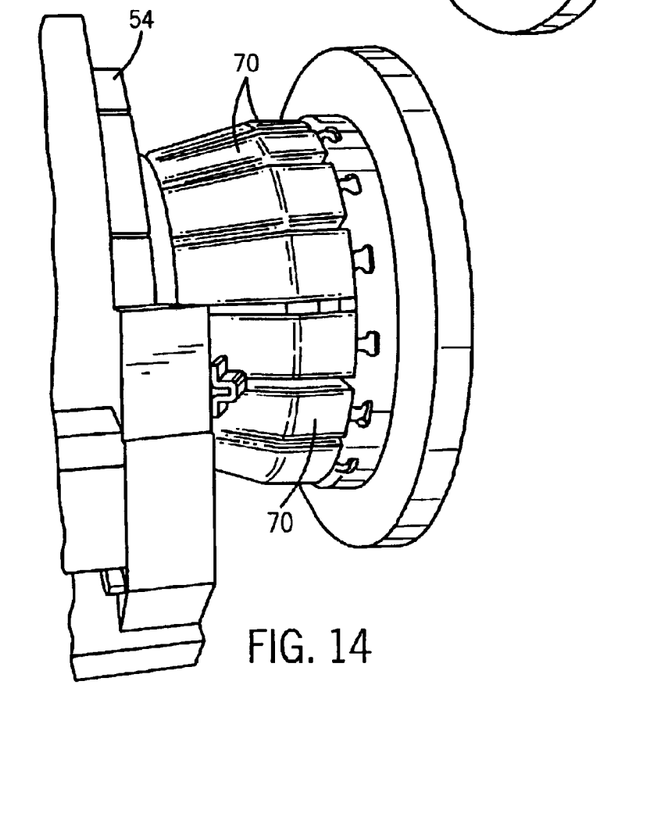

As can be seen in FIGS. 13 and 14, the base of drift tool 62 comprises a plurality of expandable members 70. When core 54 has been moved to its fullest extent along drift tool 62, members 70 expand radially (as shown in FIG. 14). Members 70 thus push the coilhead turns even farther out of the way, so that they will not interfere with the insertion of subsequent coil groups.

After one coil group has been inserted, core 54 is indexed so that the next set of winding slots will be in the proper angular position. According to the prior art, subsequent coil groups were simply inserted in the same manner until all of the slots were filled. In other words, all winding groups were inserted from the same side of the stator core.

Referring again to FIG. 9, the present invention utilizes a novel modification of the conventional procedure. Between each coil group, stator core 54 is rotated 180°, as shown by the arrow 72. As a result, successive coils are inserted from opposite sides of the stator core. This desirably produces coil ends on both sides of the stator core to which power leads can be connected.

In a winding arrangement having six coil groups, for example, three coil groups may be inserted from each end of the core. The first group, A1, is inserted in standard fashion, which may be referred to as a "forward" insertion in the context of the present invention. The stator core is then rotated, so that the group B1 can be inserted into the other end as a "reverse" insertion. Next, the stator core is rotated back to its original position, allowing insertion of group C1 as a forward insertion. Groups A2, B2 and C2 are then respectively inserted reverse, forward, reverse to complete the winding pattern. Because of this alternating coil group insertion, the process of the invention may be referred to as a "reverse wind" process.

Mechanically, the structure of machine 50 is similar to the prior art used to produce a standard concentric winding arrangement. It is necessary, however, to modify such a machine from its prior art version in order to achieve the desired results. For example, carriage 52 should be modified so the centerline of the stator core will be at the same axial location in both "forward" and "reverse" positions. Various enhancements may also be made to the controlling software to produce the desired results.

It can be seen that the present invention provides a stator assembly for an electromechanical machine having a novel winding arrangement, as well as novel methodology for producing same. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A coil pattern for a stator, comprising:
   at least six coil groups having winding coils arranged in a winding pattern of radially-disposed, axially-extending winding routes, wherein the winding coils of each group comprise at least two different cross-sectional dimensions; and
   leads extending from each of the coil groups alternatingly from each of first and second axial ends of the winding pattern.

2. The coil pattern of claim 1, wherein at least one winding coil of each group is singularly located in a respective spaced apart axial route of the radially-disposed, axially-extending winding routes and a remaining number of winding coils of each group are located in adjacent axial routes of the radially-disposed, axially-extending winding routes along with winding coils of another group of coils.

3. The coil pattern of claim 2, wherein the at least six coil groups comprise a total of six coil groups positioned in a three-phase configuration within the radially-disposed, axially-extending winding pattern.

4. The coil pattern of claim 3, wherein the coil groups are positioned in the winding pattern such that the at least one winding coil of each group singularly located in the respective spaced apart axial route is positioned adjacent to a winding coil of a different group singularly located in a respective axial route of the radially-disposed, axially-extending winding routes.

5. The coil pattern of claim 2, wherein each of the coil groups comprises a total of six winding coils.

6. The coil pattern of claim 5, wherein two of the six winding coils of each group are singularly located in respective axial routes of the radially-disposed, axially-extending winding routes and four of the six winding coils of the same group are located in axial routes of the radially-disposed, axially-extending winding routes shared with coils of a different group.

7. A coil winding pattern, comprising at least six coil groups having winding coils arranged in a winding pattern of radially-disposed, axially-extending winding routes, each coil group having windings of at least two different cross-sectional dimensions, wherein two coils of each group are singularly located in respective four winding axial routes of the radially-disposed, axially-extending winding routes and four winding coils of each group are located in respective eight winding axial routes of the radially-disposed, axially-extending winding routes shared with coils of a different group.

8. The coil winding pattern of claim 7, wherein leads from a first half of a total number of groups exit the first axial end of the winding pattern and leads from a second half of the total number of groups exit the second axial end of the winding pattern.

9. The coil winding pattern of claim 8, wherein leads from first successively alternating coil groups exit the first end of the winding pattern and leads from second successively alternating coil groups exit the second end of the winding pattern.

10. The coil winding pattern of claim 7, wherein winding coils of a first group singularly located in first axial winding routes of the radially-disposed, axially-extending winding routes are disposed adjacent to winding coils of a second group singularly located in second axial winding routes of the radially-disposed, axially-extending winding routes.

11. The coil winding pattern of claim 7, wherein each coil group comprises a total of six winding coils.

12. The coil winding pattern of claim 7, wherein the at least six coil groups comprises six coil groups inserted into the winding pattern to define a three-phase, two-pole configuration.

13. A coil winding pattern, comprising:
   a first coil group for a first electrical phase disposed in radially-disposed, axially-extending winding routes of the coil winding pattern such that leads of the first coil group exit a first axial end of the coil winding pattern;
   a second coil group for a second electrical phase disposed in radially-disposed, axially-extending winding routes of the coil winding pattern such that leads of the second coil group exit a second axial end of the stator core opposite the first axial end;
   a third coil group for a third electrical phase disposed in radially-disposed, axially-extending winding routes of the coil winding pattern such that leads of the third coil group exit the first axial end of the coil winding pattern;
   a fourth coil group for the first electrical phase disposed in radially-disposed, axially-extending winding routes of the coil winding pattern such that leads of the fourth coil group exit the second axial end of the coil winding pattern;
   a fifth coil group for the second electrical phase disposed in radially-disposed, axially-extending winding routes of the coil winding pattern such that leads of the fifth coil group exit the first axial end of the coil winding pattern; and
   a sixth coil group for the third electrical phase disposed in radially-disposed, axially-extending winding routes of the coil winding pattern such that leads of the sixth coil group exit the second axial end of the coil winding pattern.

14. The coil winding pattern of claim 13, wherein each coil group has at least one winding disposed singularly in an axial route of the radially-disposed, axially-extending winding routes and a plurality of windings disposed in axial routes of the radially-disposed, axially-extending winding routes shared with windings of a different coil group.

15. The coil winding pattern of claim 13, wherein each coil group has two windings disposed singularly in respective axial routes of the radially-disposed, axially-extending winding routes and four windings disposed in respective axial routes of the radially-disposed, axially-extending winding routes shared with windings of a different coil group.

16. The coil winding pattern of claim 13, wherein the coil groups are arranged within the coil winding pattern to define a three-phase, two-pole coil configuration.

* * * * *